US005778175A

United States Patent [19]
Paul et al.

[11] Patent Number: 5,778,175
[45] Date of Patent: Jul. 7, 1998

[54] METHOD IMPLEMENTED BY A COMPUTER NETWORK ADAPTER FOR AUTONOMOUSLY ADJUSTING A TRANSMIT COMMENCEMENT THRESHOLD VALVE UPON CONCURRENCE OF AN UNDERFLOW CONDITION

[75] Inventors: Gideon Paul, Gilo Jerusalem; Aviad Werthimer, Jerusalem; Simoni Ben-Michael, Givat Zeev, all of Israel

[73] Assignee: Digital Equipment Corporation, Maynard, Mass.

[21] Appl. No.: 577,575

[22] Filed: Dec. 22, 1995

[51] Int. Cl.$^6$ ................................................. G06F 15/176
[52] U.S. Cl. .................................... 395/200.8; 395/200.65
[58] Field of Search ................................. 395/250, 850, 395/854, 200.2, 200.8, 200.65

[56] References Cited

U.S. PATENT DOCUMENTS

| | | | |
|---|---|---|---|
| 4,692,894 | 9/1987 | Bemis | 395/250 |
| 5,299,313 | 3/1994 | Petersen et al. | 395/200.2 |
| 5,353,287 | 10/1994 | Kuddes | |
| 5,434,872 | 7/1995 | Petersen et al. | 395/250 |
| 5,446,735 | 8/1995 | Tobagi et al. | |

FOREIGN PATENT DOCUMENTS 0 577 115  1/1994  European Pat. Off.

OTHER PUBLICATIONS

IBM Technical Disclosure Bulletin, vol. 35, No. 5, 1 Oct. 1992, p. 167–171, XP000312922 "CSMA/CD LAN Adapter Transmit Data Error Handler".

Primary Examiner—Richard L. Ellis
Attorney, Agent, or Firm—Gary E. Ross

[57] ABSTRACT

A method implemented by a computer network adapter for automatic retransmission of any packet involved in an unsuccessful transmission attempt due to transmit buffer underflow conditions entails the steps of (a) stopping the transmission; and (b) retrying another transmission of the packet for up to a predetermined number of attempts with an increased transmit threshold. The transmit threshold is the number of bytes of data of the packet involved in the transmission that are stored in the transmit buffer prior to start of transmission. Preferably, for the initial transmission attempt, the adapter requires only a small number of bytes of the packet to be stored in the transmit buffer. After occurrence of a buffer underflow condition, the adapter attempts a retry in accordance with the algorithm only after a substantially larger portion of the packet has entered the transmit buffer for transmission. If any retry succeeds, the adapter need not issue an interrupt.

34 Claims, 2 Drawing Sheets

AUTOMATIC RETRANSMISSION ON UNDERFLOW CONDITION

METHOD IMPLEMENTED BY A COMPUTER NETWORK ADAPTER FOR AUTONOMOUSLY ADJUSTING A TRANSMIT COMMENCEMENT THRESHOLD VALVE UPON CONCURRENCE OF AN UNDERFLOW CONDITION

RELATED APPLICATION

This application is related to commonly assigned patent application Ser. No. 08/577,576, filed Dec. 22, 1995 by Gideon Paul, et al., and entitled, METHOD AND APPARATUS IN NETWORK ADAPTER FOR AUTOMATIC RETRANSMISSION OF PACKETS FOLLOWING AN EXCESSIVE COLLISION CONDITION.

FIELD OF THE INVENTION

The invention relates to local area networks (LANs) such as Ethernet networks, and more particularly to network adapters that control communication over the network.

BACKGROUND OF THE INVENTION

Ethernet is a commonly used name for a LAN that uses a network access protocol referred to as Carrier Sense Multiple Access with Collision Detection (CSMA/CD). The CSMA/CD protocol is defined in ANSI/IEEE Std. 802.3, published by the Institute of Electrical and Electronics Engineers, Inc., 345 East 45th Street, New York, N.Y., 10017, USA. While that standard applies to a 10 Mbps (megabits/sec) CSMA/CD channel (e.g., a network bus), it will be understood that the present invention is not limited to such channels, but can be applicable to other channels operating, for example, at 100 Mbps.

Under CSMA/CD rules for channel access, all nodes of the network have equal priority of access and may begin transmitting as soon as the channel is clear. Any node "wishing" to transmit messages must first "listen" to make sure that the channel is clear before beginning to transmit. If the node wishing to transmit does not detect any other transmissions during a predetermined period of time called the inter-packet delay or gap, e.g., of 9.6 microseconds, it commences transmission. The node sends the messages, as well as control information, over the network system in blocks, often called packets, each having a pre-determined size.

A difficulty with network operation arises within network adapters, such as Ethernet adapters, located in the individual nodes of the network. A network adapter typically manages communication between the host node containing the adapter and the network system to which it is connected.

For example, the network adapter is responsible for moving data between a disk storage facility connected to the network system and a main memory of the host node. When inbound data is received from the disk storage facility, the network adapter may transfer the data to the main memory of the host node to await further processing. To make the transfer, the network adapter must gain access to a system bus to which components of the host node are connected. Likewise, the network adapter transfers outbound data to the network after the data is retrieved over the system bus from the main memory.

The network system and the system bus may be considered shared resources, requiring arbitration to gain access to effectuate data transfers in different directions. Accordingly, a transfer of data via the network adapter requires gaining control of the shared resource, which typically entails (i) a request for access to a shared resource followed by a grant of access, and (ii) a "burst" of data of a predetermined size to/from the shared resource.

Because the shared resource may be busy performing operations for other components of the host node, the shared resource is not always available immediately for use. The time between issuance of a request to access the shared resource and grant of access to that resource constitutes "latency" of the resource. Typically, the latency varies from system to system, depending upon the characteristics of the resource, e.g., the throughput of the network system or the system bus and the number of units (e.g., host components) connected thereto.

To accommodate the variable latency, a network adapter typically includes buffer memories in both the receive and transmit paths. The receive buffer is disposed along the receive path between the network system and the system bus to temporarily store incoming data until access to the shared resource, e.g., the system bus, can be obtained and transmission thereto can commence.

The transmit buffer is disposed along the transmit path between the system bus and the network system to temporarily store outbound data. Once access to the network system is granted, a block of data, e.g., a packet, must be transferred typically at a predetermined fixed rate to the network system. The transmit buffer usually permits a steady stream of outbound data to be sent at that rate, for example, even when access to the system bus has not yet been granted.

Under some circumstances a problem may arise called buffer underflow. Buffer underflow occurs when there is insufficient data in the transmit buffer to sustain the required transmission rate, and access can not be gained to the shared resource, e.g., the system bus to remedy the data shortfall.

A buffer underflow can also occur when the rate of data entering the transmit buffer from the shared resource, e.g., the system bus, is lower than the rate of data exiting the buffer to the network system. This phenomenon can happen in nodes with high system bus latencies. This phenomenon can also happen even through the average throughput of the system bus is larger than the maximum throughput of the network system, because of the "bursty" nature of activity on the system bus; there are individual periods of time when the adapter encounters long system bus latencies even if the system bus does not normally have high latencies.

When an underflow condition occurs, typically the node stops packet transmission, discards the untransmitted portion of the packet, and sends an interrupt signal to the processor of the node. The interrupt indicates that the transmission has aborted due to an underflow condition. Since the upper network protocol layer will not see the "receive acknowledge" of the aborted packet, that layer will start activity to recover from this state, but only after a length of time on the order of several seconds. The involvement of the upper network protocol layer for these purposes is time consuming and causes degradation of system performance (in terms of processor time) and network performance (in terms of packet delay).

To avoid buffer underflow, known network adapters commence transmission only after a pre-determined amount of data has entered the transmit buffer, that amount being referred to as a "transmit threshold." The transmit threshold can be set to a substantially number of bytes, such as all of the bytes of a packet to be transmitted, or, for example, the threshold can be reached when 128 bytes of a 1518-bytes packet are already in the transmit buffer. Unfortunately, this approach adds a transmit delay to the beginning of transmission, which is equal to at least the length of time it takes for that amount of data to be obtained and stored in the transmit buffer, which is referred to as "internal transmit delay." That delay can degrade results obtained when benchmarking drivers running on the adapter, and can significantly impact network throughput particularly if the delay is longer than the inter-packet gap.

SUMMARY OF THE INVENTION

The invention resides in a method implemented by a computer network adaptor for re-transmitting data involved in an unsuccessful transmission attempt due to transmit buffer underflow, without issuing an interrupt signal to the host computer system. The value of the transmit threshold is increased from a relatively small value for the initial transmission attempt to a higher value for the retransmission. The method entails generally the steps of (a) stopping the transmission buffer on occurrence of an underflow condition and discarding any transmitted fragment of the packet at the receive end as a "runt" packet; and (b) substantially immediately retrying another transmission of the packet for up to a selected number of attempts (the "retry number" or "R") using a higher transmit threshold but without any inserted delay or backoff between retries.

Preferably, for the initial transmission attempt, the adapter requires only a small number of bytes of the packet to be stored in the transmit buffer, i.e., a small value for the transmit threshold (e.g., equal to 4 bytes). After occurrence of a buffer underflow condition, the adapter attempts a retry in accordance with the invention only after a substantially larger portion of the same packet has entered the transmit buffer for transmission. This requirement is intended to overcome the peak latency that frequently causes the initial underflow condition. If any retry succeeds, the adapter need not issue an interrupt for notifying failed transmission. The algorithm can count the retries of transmission of underflow packets and report the count for network or system monitoring purposes.

More specifically, in operating an adapter connected to a shared resource for transmitting data thereto, the invention provides a method for packet transmission and automatic retrying of packet transmission in the event of a buffer underflow. The method in accordance with the invention includes the steps of (A) commencing transmission after a pre-determined first amount of data is stored in a transmit buffer; (B) if a buffer underflow condition then occurs, stopping transmission, and commencing transmission again only after a pre-determined second amount of data, larger than the first amount of data, is stored in the transmit buffer; and C) substantially immediately after step (B), commencing transmission again and repeating step (B) and this step (C), in order, for a number of times until either completion of transmission of the packet or a preselected limit on the retry number or count is reached. If the latter occurs, the method discards the data of the packet in the transmit buffer and generates a signal indicative of an underflow condition.

BRIEF DESCRIPTION OF THE DRAWINGS

The foregoing and other objects, advantages and features of the invention will be more readily understood with reference to the following-detailed description of the invention in conjunction with the accompanying drawings, in which.

DESCRIPTION OF A PREFERRED EMBODIMENT

Figure 1:
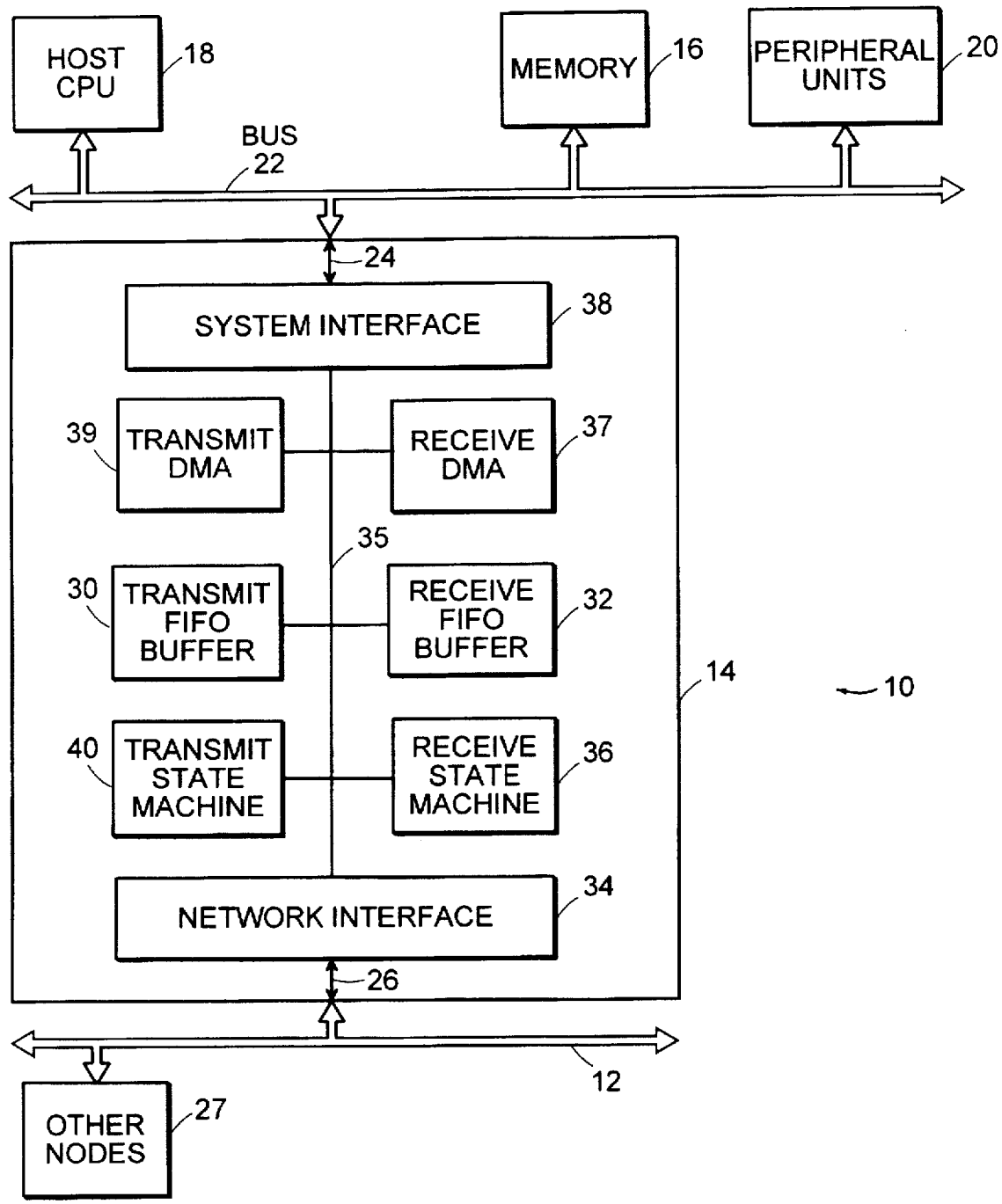
FIG. 1 is a representation in block diagram form of a node connected to a network system in accordance with an embodiment of the invention.

FIG. 1 illustrates a node 10, e.g., a computer system, connected to a network system 12, such as a LAN or disk storage facility. The node 10 includes an network adapter 14, a main memory 16, a CPU 18, and other peripheral units 20, such as terminals, all of which are interconnected by a system bus 22, e.g., a PCI bus. The adapter 14 connects to the system bus 22 through a preferably bi-directional path 24, and connects to the network system 12 through a preferably bi-directional path 26. The network system 12 embodies preferably a bus topology to accommodate, e.g., high-bandwidth, half-duplex data communication among the adapter 14 of node 10 and adapters (not shown) of other nodes 27, e.g., of similar construction, connected thereto. Alternatively, the adapter 14 may be configured instead to provide full-duplex communication between the nodes 10, 27 coupled to the network system 12.

During a receive operation, data is transferred from the network 12 into the adapter 14 and is eventually transferred to the main memory 16 to await processing. Data transfer between the adapter 14 and the main memory 16 is performed in accordance with a direct memory access (DMA) transfer on the system bus 22. A DMA transfer involves a request for access to the system bus followed by a grant of access and a "burst" of data of a predetermined size. During a transmit operation, data retrieved from the main memory 16 is transferred from the adapter 14 to the network system 12. Transfers of data between the network system 12 and the adapter 14 are, e.g., at a fixed rate on an individual packet basis.

The system bus 22 is not always immediately available for access by the adapter 14 to perform read and write transfers to the main memory 16. The bus 22 may be busy performing other operations involving other units connected to it, or another component, e.g., units 20, may be performing a read or write memory transfer. Consequently, the system bus 22 is considered a shared resource (as is the main memory 16), and the time between issuance of a request to access the system bus 22 and grant of access to the bus constitutes "latency" of the system bus 22.

To accommodate bus latency, the adapter 14 includes a buffer memory, preferably comprising a FIFO ("first-in-first-out") transmit buffer 30 and a FIFO receive buffer 32. Data entering the adapter 14 over line 26 from the network system 12 passes through a network interface 34 under the control of a receive state machine 36, into the receive buffer 32. The receive buffer 32 provides temporary storage of the data until the adapter 14 gains access to the system bus 22, at which time a receive DMA (direct memory access) module 37 "reads" the data in the receive FIFO buffer 32 and performs a write transfer to the main memory 16. Thereafter, the data passes through a system bus interface 38 and onto the system bus 22, and is written to main memory 16.

Data to be transmitted to the network system 12 is read from the main memory 16 by a transmit DMA module 39 upon the system bus interface 38 accessing the system bus 22, and the data is placed in the transmit buffer 30. When the adapter 14 gains access to the network system 12, the data is provided to the network interface 34 under control of a transmit state machine 40, and then onto the network system 12. The components of the adapter 14 are interconnected by an internal bus 35.

The network interface 34 contains conventional data path logic and physical connections needed to ensure that the adapter 14 meets the timing and electrical characteristics required to communicate with the network system 12. For example, the network interface 34 can include a media access control ("MAC") for implementing the applicable network protocol, e.g., Ethernet, of the network 12.

The system bus interface 38 contains the conventional data path logic and physical connections needed to ensure that the adapter 14 meets the timing and electrical characteristics required to communicate on the system bus 22. For example, the system bus 22 can be, for example, a PCI bus, and the interface 38 can be, for example, a PCI bus interface.

Bi-directional data flow through the adapter 14 is controlled by an arbiter function of the interface 38. The arbiter function arbitrates for control of the system bus 22 on behalf of the DMA machines 37, 39 in accordance with conventional arbitration processes. As with the receive and transmit state machines 36, 40, the arbiter module 38 preferably includes registers and combinational logic (not shown) configured as sequential logic circuits.

The DMA machines 37 and 39 direct the bi-directional flow of data between the network and the system bus 22 through the transmit and receive buffers 30, 32. Specifically, the transmit DMA machine 39 initiates transfer of outbound data bursts from the main memory 16 with a read transfer on the system bus. These outbound data bursts are temporarily stored in the transmit buffer 30 and subsequently transmitted, by the transmit state machine 40, onto the network system 12. The receive state machine 36 manages inbound data bursts from the network system 12 and temporarily stores the data in the receive buffer 32 and the receive DMA state machine 37, moves the data to the memory 16 via the bus interface 38 and system bus 22. An example of a function performed by the state machines 36, 40 is the conversion of a serial bit stream of data to/from the network system 12 into byte-wide words after/prior to storing the data in the buffers.

Upon a predetermined threshold level of data having been received in the receive buffer 32 and upon gaining access to the system bus 22, the receive DMA machine 37 initiates transfer of a burst of inbound data of a predetermined size to the main memory 16 as a write transfer on the system bus 22. The size of a burst of data may vary depending on system bus characteristics. The amount of data transferred during a burst on the system bus 22 is typically much less than the block of data transferred, e.g., in a packet, on the network system 12. The interface 38 arbitrates on behalf of the receive DMA machine 37 and transmit DMA machine 39 for access to the system bus 22 for each transfer of a single burst of data on the bus.

To the extent not described herein, the construction and operation of the state machines 36, 40, the DMA machines 37, 39, and the interface module 38 will be apparent to those skilled in the art, and are conventional except as indicated herein.

Figure 2:
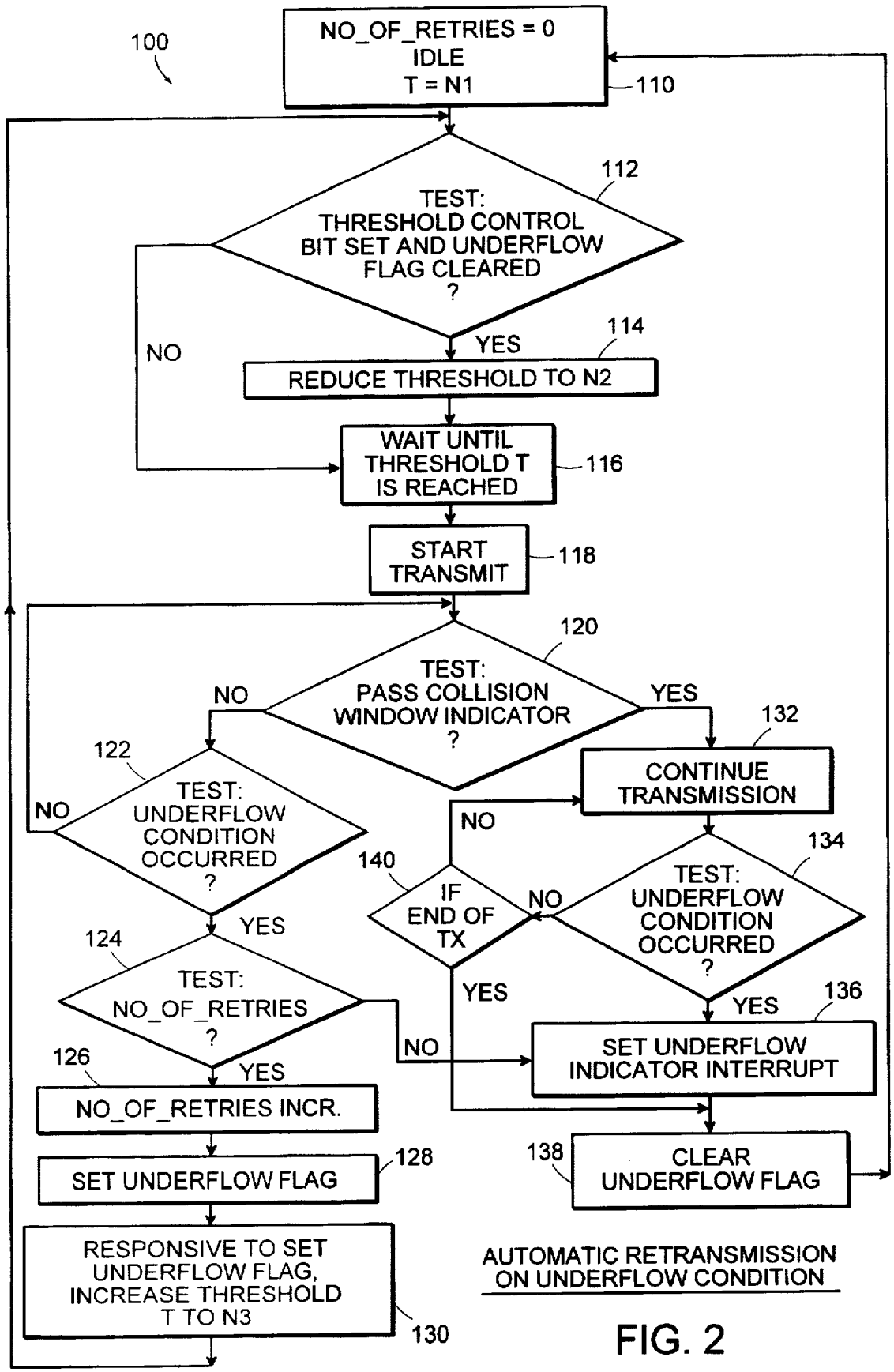
FIG. 2 is a representation, in flow chart form, of an algorithm for automatic retransmission following an underflow condition that can be implemented by the adapter of FIG. 1 in accordance with an embodiment of the invention.

FIG. 2 illustrates an algorithm 100 for automatic retransmission following transmit buffer underflow condition, which can be implemented by the transmit state machine 40.

At block 110, the transmit state machine 40 is inactive, that is in an idle mode. Block 110 fetches a new packet for transmission. Block 110 also initializes variables, including a variable called "NO_OF_RETRIES, and a variable representing a threshold "T". NO_OF_RETRIES is a count of the number of retries that the transmit state machine 40 has attemted for data from the same packet following a transit buffer underflow condition. The maximum number of retries permitted without issuing an interrupt to the host computer system, as described below, is represented by the variable "R" of retries that the transmit number of bytes required to be available in the transmit buffer 30 before transmission will be permitted to begin.

The variable R and T both have values that are preferably programmable to account for individual needs of the particular adapter in which the algorithm 100 is implemented. The invention can place a limit on the value of NO_OF_RETRIES, corresponding to the variable R. For example, a fixed limit of one (1), which will cause the transmit state machine to attempt a single retransmission attempt whenever an underflow condition occurs.

Variable T can be set initially to a value of N1, though it can assume, for example, any of three values N1, N2, or N3 during operation of the adapter 14, where N1 is an intermediate value, N2 is less than or equal to N1, and N3 is greater than or equal to N1 (N2≦N1≦N3). N1 is equal to, e.g., 72 bytes. N2 is equal to, e.g., the number of bytes contained in the minimal addressable block data (i.e., a single longword) in the transmit buffer 30 and thus the minimal number of bytes that the transmit state machine 40 can fetch therefrom. Accordingly, N2 can be as few as 4 bytes of data. N3 is equal to a substantial portion of the packet, e.g., 128 bytes.

Block 112 tests whether both a threshold control bit is set, e.g., to a logic HIGH, and an underflow flag cleared, e.g., to logic LOW. Responsive to the threshold control bit being set and the underflow flag cleared, block 114 reduces the threshold T from its initial value of N1 to its value N2, thus reducing the number of bytes required in the transmit buffer 30 for commencing transmission. The underflow flag indicates whether an underflow has occurred, and, if set, as described below, will cause the algorithm 100 to change the value of T to the largest of its possible values, i.e., N3.

After block 114, or if the test of block 112 produces a negative result (i.e., the threshold control bit is cleared or the underflow flag is set), block 116 causes the transmit state machine to wait until the threshold T is reached, i.e., until the transmit buffer 30 has the number of bytes available for transmission determined by the applicable value of T. Then, block 118 causes transmission to begin.

Block 120 tests whether a collision window has expired. The collision window is the time during which the adapter listens for collisions on the network 12, and is sometimes referred to as the network acquisition time. The collision window is specified by another variable referred to as the collision window indicator, and represents a system parameter determined typically by the specifications of the network. In 10-Mbps Ethernet networks, the collision window indicator will specify a network acquisition time of 51.2 microseconds.

If the collision window specified by the collision window indicator has not expired, block 122 tests whether the underflow flag is set so as to indicate that an underflow condition has occurred. As described above, an underflow condition occurs when the transmit buffer 30 lacks packet data sufficient to meet the required transmission rate for the network. If the underflow flag is not set, the algorithm 100 returns to block 120 to examine whether the collision window has expired.

On the other hand, if the test of block 122 indicates that the underflow flag condition occurs, block 124 tests whether the NO_OF_RETRIES is less than a limit of R, e.g., one. In other words, if an underflow condition occurs during the collision window and the number of retries is less than R, the test of block 124 will yield a "YES"; otherwise, the test of block 124 will yield a "NO".

With an affirmative result to the test of block 124, the algorithm 100 proceeds to block 126 which increments the NO_OF_RETRIES, e.g., by one. Thus, after the first pass over block 126, NO_OF_RETRIES=1.

Block 128 causes the underflow flag to be set and schedules the underflowed packet for retransmission. Block 130 responds to the set underflow flag by increasing the threshold to the value N3. Subsequently, the algorithm 100 returns to block 112.

If the test of 120 indicates that the collision window has expired, block 132 causes the transmit state machine to continue transmission of the packet.

After a preselected period of time, called the testing interval, block 134 tests the underflow condition to determine whether an underflow has occurred at a time after the collision window has expired. If such an underflow has occurred, block 136 asserts an underflow interrupt and block 138 then clears the underflow flag. Following block 138, the algorithm 100 returns to block 110, where the transmit state machine 40 resumes its idle mode and the variables are reset as described above in conjunction with that block.

If the test of block 134 indicates that an underflow has not occurred, block 140 then tests whether the packet transmission has been completed by determining whether an end transmit packet has been sent. If transmission has not been completed, the algorithm 100 returns to block 132 where transmission is continued. On the other hand, if the transmission has been completed, the algorithm 100 proceeds to block 138 where the underflow flag is cleared, and then proceeds to block 110, as described above.

Accordingly, algorithm 100 provides an efficient technique for automatic retransmission in the event of an underflow of data to the transmit buffer 30, which can improve system performance and reduce data latency.

It should be evident that algorithm 100 implements "automatic retry" only if the underflow occurred during transmission in the collision window interval. The invention can be implemented more generally for implementing "automatic retry" at any time during the transmission period, including both during and after the collision window interval.

Other Features and Embodiments

An illustrative implementation of the invention was described above. Various other features and embodiments will be apparent to those skilled in the art from the disclosure set forth herein. For example, while retry for underflow may occur in the described embodiment at any time as long as the packet data is not overwritten in the transmit buffer, the invention can also be implemented so that the retry only occurs if the underflow happens after the transmission collision window.

It is also possible to implement the invention with an algorithm for computing and storing a value for R based on underflow history information, network traffic conditions, and/or bus load conditions, so as to optimize the likelihood of successful transmission.

Consider, specifically, transmit buffer underflow conditions in this regard. Underflow occurs when the host system bus peak latencies are high and/or the system bus throughput is small. Consequently, underflow is mainly a function of the host CPU system bus. On the other hand, if the network is congested and R is set to a high value, unnecessary interference to the network is being introduced. Accordingly, in some applications, it makes sense to use a dynamically computed value (rather than a preset, constant value) for R so as to reduce its value during periods of high network congestion and/or high host CPU bus load. Accordingly, block 124 may compute R based on the above-mentioned conditions prior to using that computed value in testing NO_OF_RETRIES, instead of using a fixed value for limit R.

It is also possible to use an algorithm to compute a backoff schedule, in which, after a predetermined number of unsuccessful retries, a delay of computed duration is inserted before subsequent retries in order to avoid the condition that caused the retries to be unsuccessful.

For underflow, the starting time of the retry may also be a function of the number of bytes of the involved packet that have been DMA'ed into the transmit buffer. The function can be a programmed value (e.g., retry being started upon at least 160 bytes of the packet being contained in the buffer) or adaptive in that it may learn from history or be a function of the number of retries.

Accordingly, the invention can minimize packet loss and enable underflow recovery without upper network layer involvement. Consequently, the invention provides a fast and simple way to deliver packets, even when an underflow occurs under transients of large system bus latencies. The invention can also decrease average packet delay by avoiding upper network layer involvement. Moreover, the invention allows a shorter delay time from start of packet transfer into the transmit buffer until start of transmission because there is no need to await receipt of the typically larger amount of the packet that the prior art requires in order to avoid underflow.

While this invention has been described with reference to specific embodiments, this description is not meant to be construed in a limiting sense. Various modifications of the disclosed embodiments, as well as other embodiments of the invention, will be apparent to persons skilled in the art upon reference to this description. It is therefore contemplated that the appended claims will cover any such modifications or embodiments as fall within the true scope of the invention.

What is claimed is:

1. In operating an adapter connected to a shared resource for transmitting data thereto, said adapter having a transmit buffer, a method for packet transmission and automatic retrying of packet transmission in the event of a buffer underflow, said method comprising the steps of:

A) commencing transmission after a pre-determined first amount of data is stored in a transmit buffer; and B) after the transmission commencing step, if a buffer underflow condition occurs, said adapter, without issuing an interrupt signal indicative of said underflow condition, performing the steps comprising stopping transmission, and then storing a pre-determined second amount of data, larger than and including the first amount of data, in said transmit buffer;

C) substantially immediately after step (B), commencing transmission again and repeating step (B) and this step (C) for a number of times until one of a first and second condition occurs, said first condition comprising completing transmission and said second condition comprising reaching a limit for said number of times said step (B) is repeated.

2. The method of claim 1, wherein said limit comprises a pre-determined fixed value.

3. The method of claim 1, further comprising computing said limit based on prior underflow conditions experienced by said adapter.

4. The method of claim 1, wherein said adapter issues an interrupt signal indicative of a buffer underflow condition upon reaching said limit.

5. The method of claim 1, wherein steps (B) and (C) are performed only if a transmit buffer underflow condition occurs during a collision window interval.

6. In operating an adapter connected to a shared resource for transmitting data thereto, said adapter having a transmit buffer, a method for packet transmission and automatic retrying of packet transmission in the event of a buffer underflow, said method comprising the steps of:

A) setting a threshold variable T to a first value N2, said threshold variable being indicative of a number of bytes required in said transmit buffer prior to commencing transmission;

B) causing said adapter to obtain data of a packet to be transmitted to said shared resource, storing said data in said transmit buffer;

C) commencing transmission of said packet to said shared resource only after T bytes of data of said packet are stored in said transmit buffer; and D) testing whether a pre-determined period of time has expired since commencing transmission of said packet, said period of time comprising a collision window;

(i) if said collision window has expired, continuing transmission until one of a first and second condition occurs, said first condition comprising a buffer underflow condition and said second condition comprising completion of transmission.

(ii) if said collision window has not expired, repeating step (D), (iii) if a buffer underflow condition occurs in step (D)(i) and if a retry count has reached a pre-determined limit, stopping transmission and generating a message signal indicative of said condition;

(iv) if a buffer underflow condition occurs in step (D)(i) and if the retry count is below said pre-determined limit, changing said retry count to reflect said transmission of step (D) without issuing an interrupt signal indicative of said underflow condition to a host computer system, and causing said adapter to increase said threshold variable to a second value N3 that is larger than said first value N2, and repeating steps (B), (C) and (D) with respect to said packet.

7. A method implemented by a computer system adapter for re-transmitting data over a communication channel following an initial transmission attempt that was unsuccessful due to a transmit buffer underflow condition, said adapter storing a predetermined amount of said data in a transmit buffer prior to commencing said initial transmission, said amount corresponding to a predetermined transmit threshold, said method comprising the steps of:

A) selecting a predetermined, larger transmit threshold;

B) adding a predetermined amount of data to said data stored in said transmit buffer such that a larger amount of data is stored in said transmit buffer which corresponds to said larger transmit threshold;

C) retrying transmission of said larger amount of data from said transmit buffer; and D) wherein said steps (A) through (C) are performed without an interrupt being issued to a host computer system with respect to said underflow condition occurring during said initial transmission attempt.

8. The method in accordance with claim 7, further comprising the step of issuing said interrupt to said host computer system if a buffer underflow condition occurs during said transmission retry of step (C).

9. The method in accordance with claim 7, further comprising the step of repeating steps (A) through (C) in the event that a buffer underflow condition occurs during said transmission retrying of step (C).

10. The method of claim 7, wherein steps (A) through (C) are performed only if said transmit buffer underflow condition occurs for said initial transmission attempt during a collision window interval.

11. The method in accordance with claim 7, further comprising the step of repeating steps (A) through (C) for up to a selected maximum number of retries until said transmission occurs without a buffer underflow condition.

12. The method in accordance with claim 11, further comprising the step of issuing an interrupt to said host computer system if a buffer underflow condition occurs upon said maximum number of retries.

13. A method implemented by a computer system adapter for re-transmitting data over a communication channel following an initial transmission attempt with respect to said data that was unsuccessful due to a transmit buffer underflow condition, said adapter storing a predetermined amount of said data in a transmit buffer prior to commencing said initial transmission, said amount corresponding to a predetermined transmit threshold, said method comprising the steps of:

A) without issuing an interrupt to a host computer system with respect to a transmit buffer underflow condition, said adapter performing the following steps:

(i) continuing to store said data in said transmit buffer during this step (A);

(ii) adding a predetermined amount of data to said data stored in said transmit buffer such that a predetermined larger amount of data is stored in said transmit buffer which corresponds to a predetermined larger transmit threshold; and (iii) retrying transmission of said larger amount of data from said transmit buffer;

B) repeating step (A) for up to a selected maximum number of retries until said transmission occurs without a buffer underflow condition; and C) issuing said interrupt to said host computer system if a buffer underflow condition occurs upon said maximum number of retries.

14. The method of claim 13, wherein steps (A) to (C) are performed only if a transmit buffer underflow condition occurs during a collision window interval.

15. The method of claim 13, wherein said amounts of data corresponding to said transmit thresholds comprise programmable values.

16. In a computer system having a processor, memory, and network adapter interconnected by a system bus, a method implemented by said computer system to manage transmission of data from said computer system to a network system, comprising the steps of:

A) transferring a number of bytes of data from said host memory to said adapter across said system bus, said adapter having a transmit buffer for storing said data;

B) commencing a transmission of said data to said network system upon reaching a pre-determined transmit threshold level corresponding to an initial number of bytes of said data being stored in said transmit buffer of said adapter;

C) if a transmit buffer underflow condition occurs during said transmission, said adapter, without issuing a signal indicative of said underflow condition to said computer system, performing the steps comprising:
  (i) stopping said transmission,
  (ii) incrementing said transmit threshold level,
  (iii) transferring an additional number of bytes of data from said memory to said adapter across said system bus,
  (iv) said transmit buffer storing an enlarged amount of data comprising said initial number of bytes of said data and said additional number of bytes of said data, corresponding to a predetermined larger transmit threshold,
  (v) attempting transmission of said enlarged amount of data;

D) if a buffer underflow condition occurs during step (C(v)), said adapter repeating step (C) for up to a pre-determined number of transmission attempts until completion of transmission; and E) if a buffer underflow condition occurs for each and every transmission attempt, up to said predetermined number of transmission attempts, discarding said data stored in said transmit buffer and generating an interrupt signal indicative of an underflow condition.

17. The method of claim 16, further comprising the step of discarding, at a receive end of said network system, any data transmitted from said adapter during a transmission in which an underflow condition occurred.

18. The method of claim 16, wherein, after a transmit buffer underflow condition, said adapter performing said transmission attempting step (C)(v) substantially immediately after said enlarged amount of data is stored in said transmit buffer.

19. The method of claim 16, further comprising the step of generating a count of transmission attempts during which a transmit buffer underflow condition occurs, and reporting said count to said processor.

20. The method of claim 16, further comprising the step of programmatically establishing said predetermined number of transmission attempts.

21. The method of claim 16, further comprising the step of programmatically establishing said transmit threshold levels.

22. The method of claim 16, wherein said initial number of bytes of said data corresponds to a minimal addressable block of data.

23. The method of claim 16, wherein steps (C)–(E) are performed only if a transmit buffer underflow condition occurs during a collision window interval.

24. The method of claim 16, further comprising the step of determining said predetermined number of transmission attempts based on transmit buffer underflow history information.

25. The method of claim 16, further comprising the step of determining said predetermined number of transmission attempts based on network traffic conditions.

26. The method of claim 16, further comprising the step of determining said predetermined number of transmission attempts based on bus load conditions.

27. The method of claim 16, further comprising the step of dynamically computing said predetermined number of transmission attempts.

28. The method of claim 16, wherein step (D) comprising the step of computing and implementing a backoff schedule wherein said adapter inserts a delay of computed duration prior to repeating step (C)(v).

29. The method of claim 16, further comprising the step of programmatically establishing commencement of said transmission attempting step based on said number of bytes stored in said transmit buffer.

30. The method of claim 16, further comprising the step of adaptively establishing commencement of said transmission attempting step based on a history of said number of bytes stored in said transmit buffer.

31. The method of claim 16, further comprising the step of establishing commencement of said transmission attempting step based on a history of said unsuccessful transmissions.

32. The method of claim 16, further comprising the step of recovering from said transmit buffer underflow condition without upper network layer involvement, said recovering step comprising steps (C) through (E).

33. The method of claim 16, wherein said transmit buffer underflow condition occurs when, while transmitting data stored in said transmit buffer at a predetermined rate across a communication channel, access to a shared resource providing data to said transmit buffer can not be obtained to remedy data shortfalls.

34. The method of claim 16, wherein said transmit buffer underflow condition occurs when, while transmitting data stored in said transmit buffer at a predetermined rate across a communication channel, a shared resource providing data to said transmit buffer does so at a rate slower than said predetermined rate, resulting in a data shortfall.

* * * * *